(12) United States Patent
Katamachi

(10) Patent No.: US 7,290,348 B2
(45) Date of Patent: Nov. 6, 2007

(54) DEVICE FOR MEASURING CIRCULARITY AND CYLINDRICAL SHAPE

(75) Inventor: Shozo Katamachi, Mitaka (JP)

(73) Assignee: Tokyo Seimitsu Co., Ltd, Tokyo (JP)

( * ) Notice: Subject to any disclaimer, the term of this patent is extended or adjusted under 35 U.S.C. 154(b) by 0 days.

(21) Appl. No.: 11/229,132

(22) Filed: Sep. 15, 2005

(65) Prior Publication Data

US 2006/0085995 A1 Apr. 27, 2006

(30) Foreign Application Priority Data

Oct. 27, 2004 (JP) ............................. 2004-312246

(51) Int. Cl.
*G01B 1/00* (2006.01)
(52) U.S. Cl. ........................... 33/550; 33/551; 33/568; 33/573
(58) Field of Classification Search .................. 33/549, 33/543, 546, 551, 552, 553, 554, 568, 573, 33/550, 501.02, 555.1; 702/155, 157, 167, 702/97

See application file for complete search history.

(56) References Cited

U.S. PATENT DOCUMENTS

| | | | | |
|---|---|---|---|---|
| 1,766,037 A * | 6/1930 | Dawson | ........................ | 33/549 |
| 3,315,365 A * | 4/1967 | Aldeborgh | .................. | 33/573 |
| 4,483,079 A | 11/1984 | Band et al. | | |
| 4,592,149 A * | 6/1986 | Long | ........................... | 33/550 |
| 4,594,757 A * | 6/1986 | Johnson, Jr. | ................. | 33/550 |
| 4,682,418 A | 7/1987 | Tuss et al. | | |
| 4,763,420 A | 8/1988 | McCabe et al. | | |
| 4,798,006 A * | 1/1989 | Barnaby | ........................ | 33/573 |
| 4,914,828 A * | 4/1990 | Fiedor et al. | ................. | 33/554 |
| 5,068,972 A * | 12/1991 | Herzog et al. | ................ | 33/503 |
| 5,572,798 A * | 11/1996 | Barnaby | ........................ | 33/549 |
| 5,579,246 A * | 11/1996 | Ebersbach et al. | ............ | 702/95 |
| 5,778,549 A * | 7/1998 | Campanile | .................... | 33/503 |
| 6,062,062 A * | 5/2000 | Toida et al. | ................... | 33/502 |
| 6,526,364 B2 * | 2/2003 | Omori et al. | ................. | 702/95 |
| 6,957,496 B2 * | 10/2005 | Raab et al. | .................... | 33/503 |

FOREIGN PATENT DOCUMENTS

DE 44 07 550 A1 9/1995
DE 102 14 489 A1 10/2003

(Continued)

OTHER PUBLICATIONS

Patent Abstract of Japan, Publication No. 05231806 A, Published Sep. 7, 1993, in the name of Yagi.

(Continued)

*Primary Examiner*—G. Bradley Bennett
*Assistant Examiner*—Travis Reis
(74) *Attorney, Agent, or Firm*—Christie, Parker & Hale, LLP

(57) ABSTRACT

The invention provides a circularity and cylindrical shape measuring device that can decrease the measurement errors generated due to the weight of a measured workpiece. A circularity and cylindrical shape measuring device (10) is configured such that a rotation axis of a rotary table (30) is positioned on a leg (21) that supports a base table (20) or is positioned on a straight line that connects adjacent legs (21A and 21B)

8 Claims, 8 Drawing Sheets

FOREIGN PATENT DOCUMENTS

| | | | |
|---|---|---|---|
| JP | 57147002 A | * | 9/1982 |
| JP | 5-231806 | | 9/1993 |
| JP | 10-185546 | | 7/1998 |

OTHER PUBLICATIONS

European Search Report, dated Dec. 9, 2005, for application No. 05255686.7, in the name of Tokyo Seimitsu Co., Ltd.

EPO Patent Abstracts of Japan for Publication No. 05231806, Publication date Sep. 7, 1993, in the name of Shinichiro Yagi.

EPO Patent Abstract of Japan, Publication No. 10185546, dated Jul. 14, 1998, in the name of Mori Kanji.

European Search Report dated Feb. 15, 2006 for Application No. 05255686.7 in the name of Tokyo Seimitsu Co., Ltd.

* cited by examiner

PRIOR ART

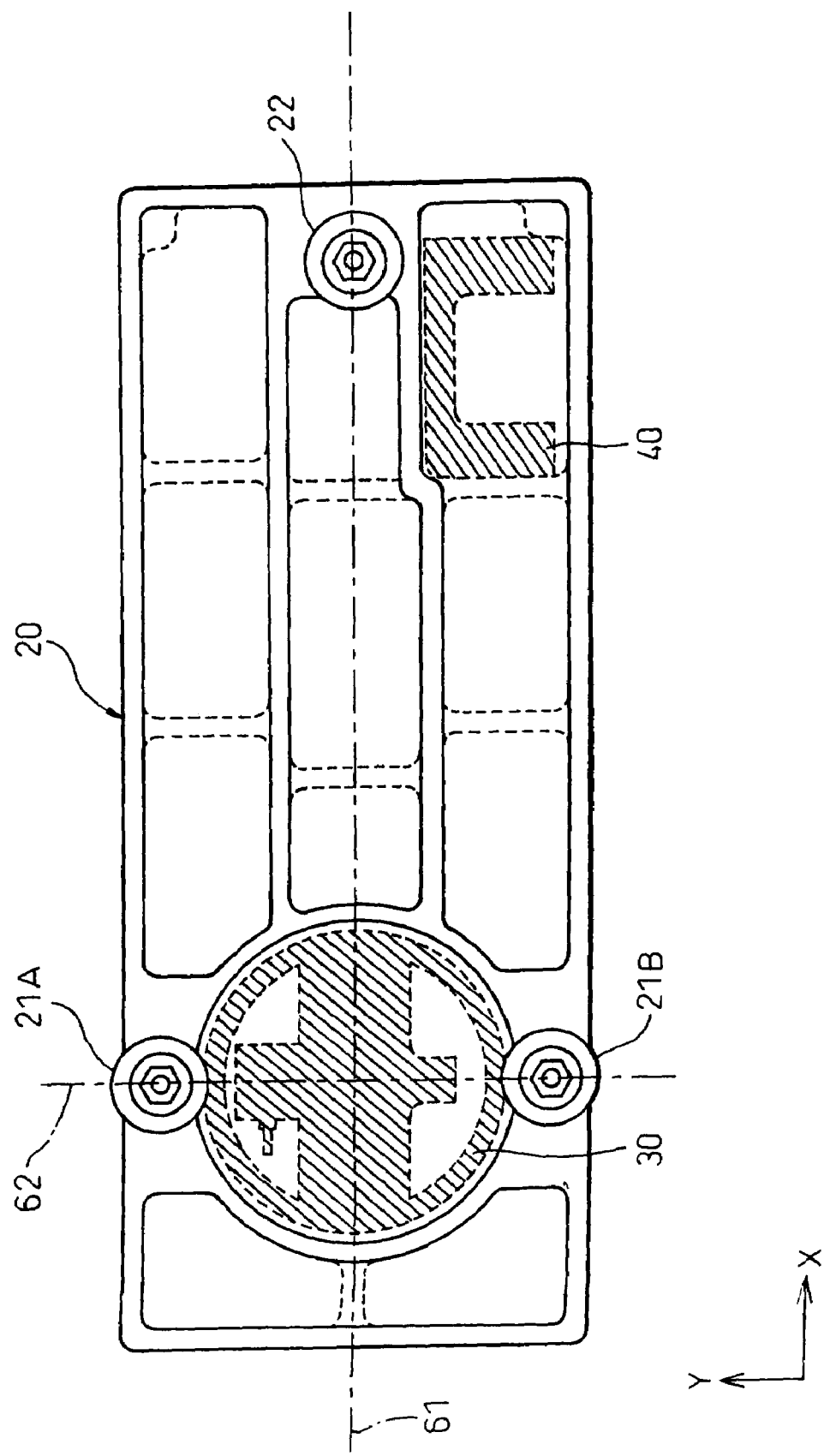

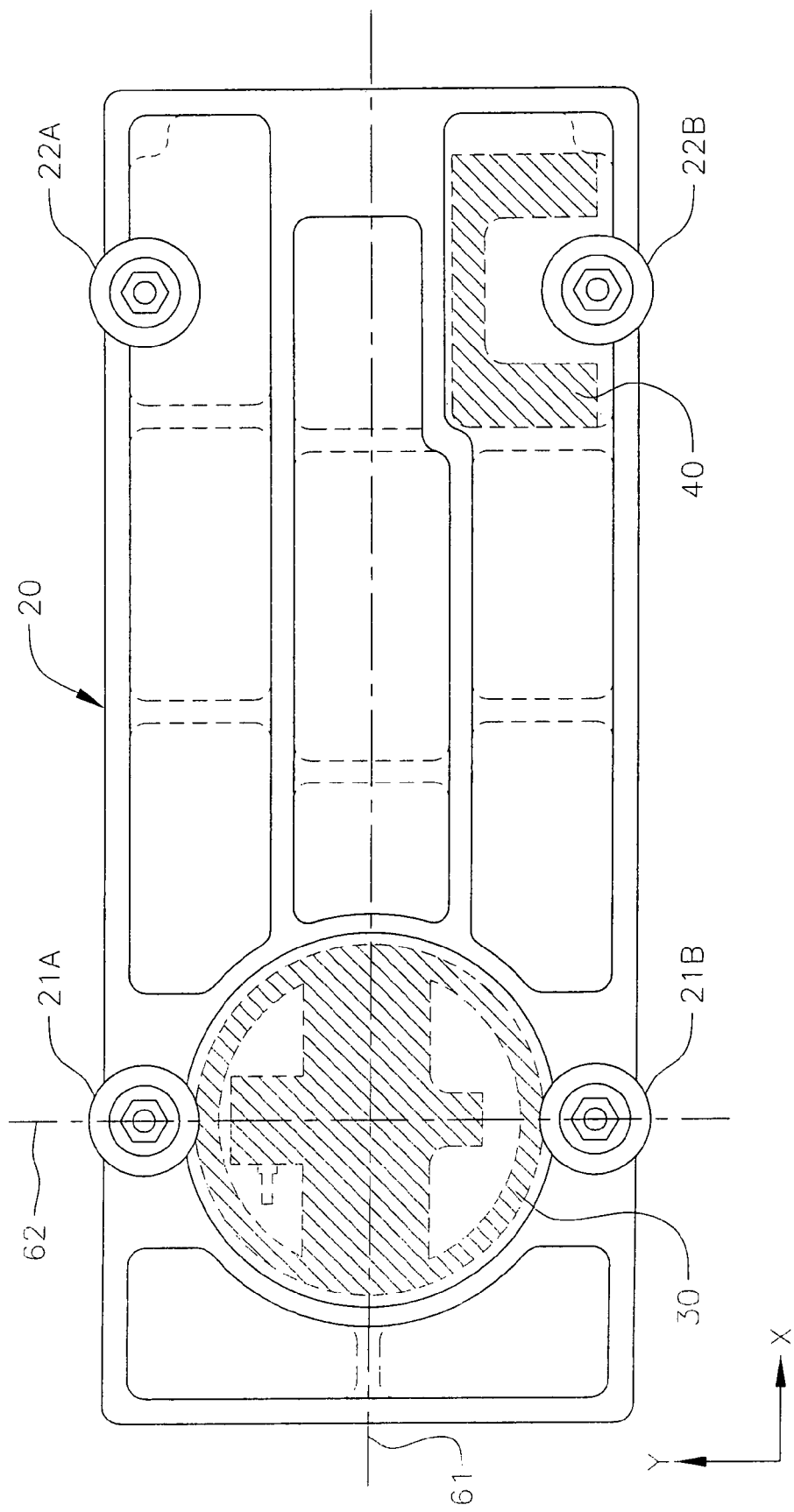

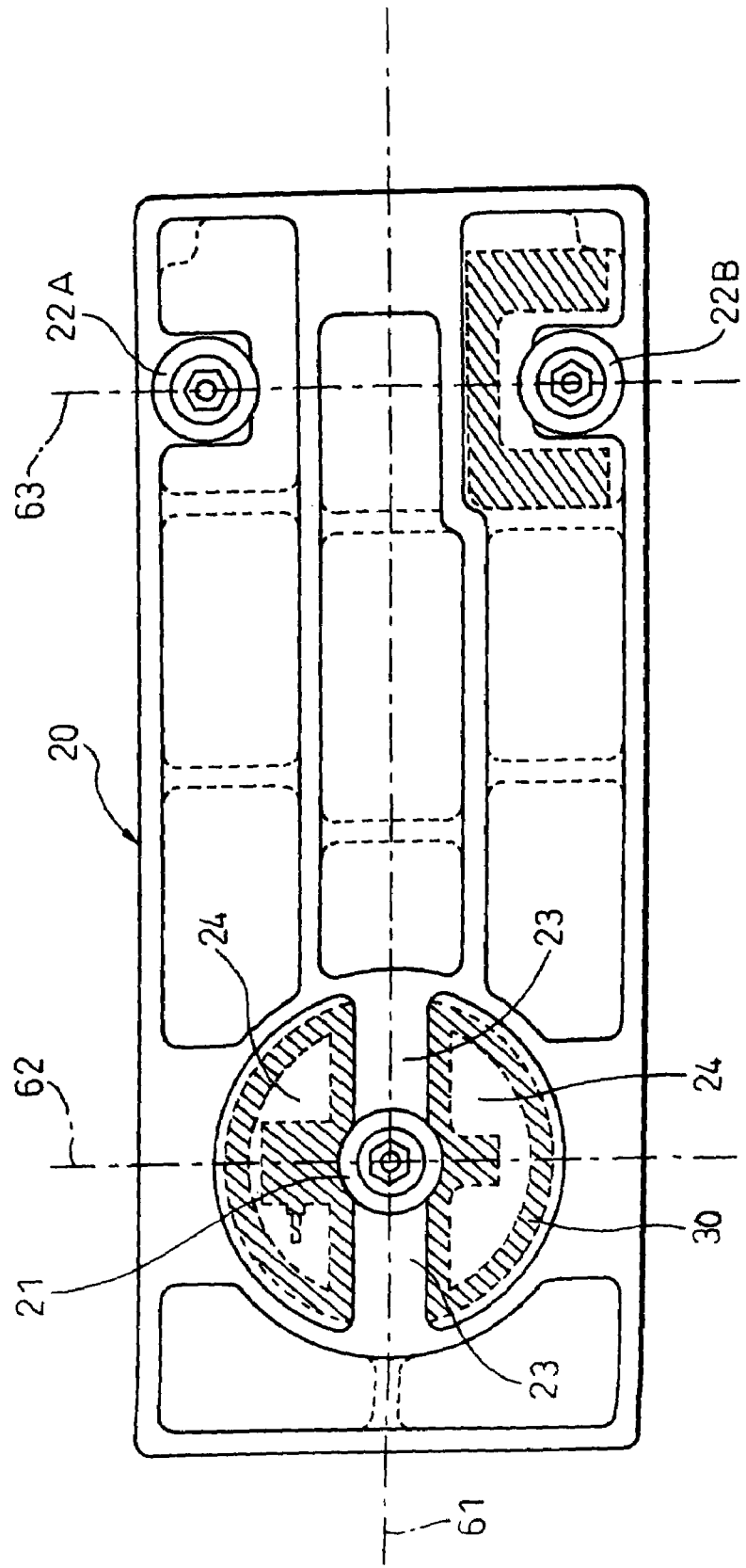

DEVICE FOR MEASURING CIRCULARITY AND CYLINDRICAL SHAPE

CROSS-REFERENCE TO RELATED APPLICATION

This application claims priority of Japanese Patent Application Number 2004-312246, filed on Oct. 27, 2004.

BACKGROUND OF THE INVENTION

1. Field of the Invention

The present invention relates to a device that measures circularity and cylindrical shape of a workpiece. Particularly, the invention relates to a circularity and cylindrical shape measuring device capable of preventing an error, in a measurement, resulting from deflection of a measuring table attributable to the mass of a workpiece mounted on the measuring table.

2. Description of the Related Art

FIG. 1 shows a configuration of a conventional device that measures circularity and cylindrical shape of a workpiece disclosed in Japanese Patent Application Unexamined Publication No. 5-231806. A rotary table 30 is rotatably provided on a base table 20 of a circularity and cylindrical shape measuring device 10. The rotary table 30 is rotated by driving a motor not shown. X axis knobs 31 and Y axis knobs 32 are provided on the rotary table 30. When one X axis knob 31 is operated, the table 30 moves to an X axis direction, and an inclination of the table 30 in the X axis direction is adjusted with the other X axis knob. When one Y axis knob 32 is operated, the table 30 moves to a Y axis direction, and an inclination of the table 30 in the Y axis direction is adjusted with the other Y axis knob.

A column 40 is erected on the base table 20. An up-and-down table 41 that moves in a vertical direction along the column 40 is supported on the column 40. An arm 42 is supported, and is movable in left and right directions in FIG. 1, on the up-and-down table 41. A probe 44 is provided on the arm 42 via a detector 43. The rotary table 30 is rotated in a state that the probe 44 is in contact with a to-be-measured object (i.e., a workpiece) 50 mounted on the rotary table 30, to thereby measure the circularity of the workpiece 50.

SUMMARY OF THE INVENTION

According to this circularity and cylindrical shape measuring device 10, the parallelism between a rotation axis of the rotary table 30 and a moving axis (i.e., a Z axis) of the column 40, forming a moving mechanism that moves the probe 44 to a rotation axis direction, is important.

According to the conventional circularity and cylindrical shape measuring device 10, four or three legs, of which the heights can be adjusted, are provided at four corners of the base table 20 on which the rotary table 30 and the column 40 are mounted. The four or three legs are disposed at the outmost ends of the base table 20 to stabilize the device, or at Airy points (i.e., minimum deflection points) to minimize deflection of the base table 20 so that the barycenter of the device is positioned at the center of the base table 20. However, according to the circularity and cylindrical shape measuring device, there occurs a difference in sizes of deflection of the base table 20 due to variation in the weight of the workpiece 50 that is mounted on the rotary table 30. This generates an inclination in the rotation axis of the rotary table 30 and the column 40, which results in a change in the parallelism of the axis. Although this inclination is small, this inclination cannot be disregarded in high-precision measurement. When the device has a low weight, the stiffness of the column 40 and the rotary table 30 decreases, and the inclination increases.

In the light of the above conventional problems, it is an object of the present invention to provide a circularity and cylindrical shape measuring device that can decrease the measurement errors that occur due to the weight of the workpiece.

In order to achieve the above object, according to the present invention, a rotation axis of the rotary table of the circularity and cylindrical shape measuring device is positioned on one of legs that support the base table, or on a straight line that connects adjacent legs.

Further, the moving mechanism that moves the probe is positioned on one of legs that support the base table, or on a straight line that connects adjacent legs.

In the present invention, mass sensors that detect the mass of the workpiece are provided on the circularity and cylindrical shape measuring device. Based on detection signals from the mass sensors, the measuring device corrects an error in a measurement result generated due to deflection in the base table.

BRIEF DESCRIPTION OF THE DRAWINGS

The present invention will be more clearly understood from the description as set below with reference to the accompanying drawings, wherein:

FIGS. 3A and 3B are bottom plan views showing first examples of installation positions of legs of a base table;

FIG. 4 is a bottom plan view showing a second example of installation positions of legs of a base table;

DESCRIPTION OF THE PREFERRED EMBODIMENTS

Figure 1:
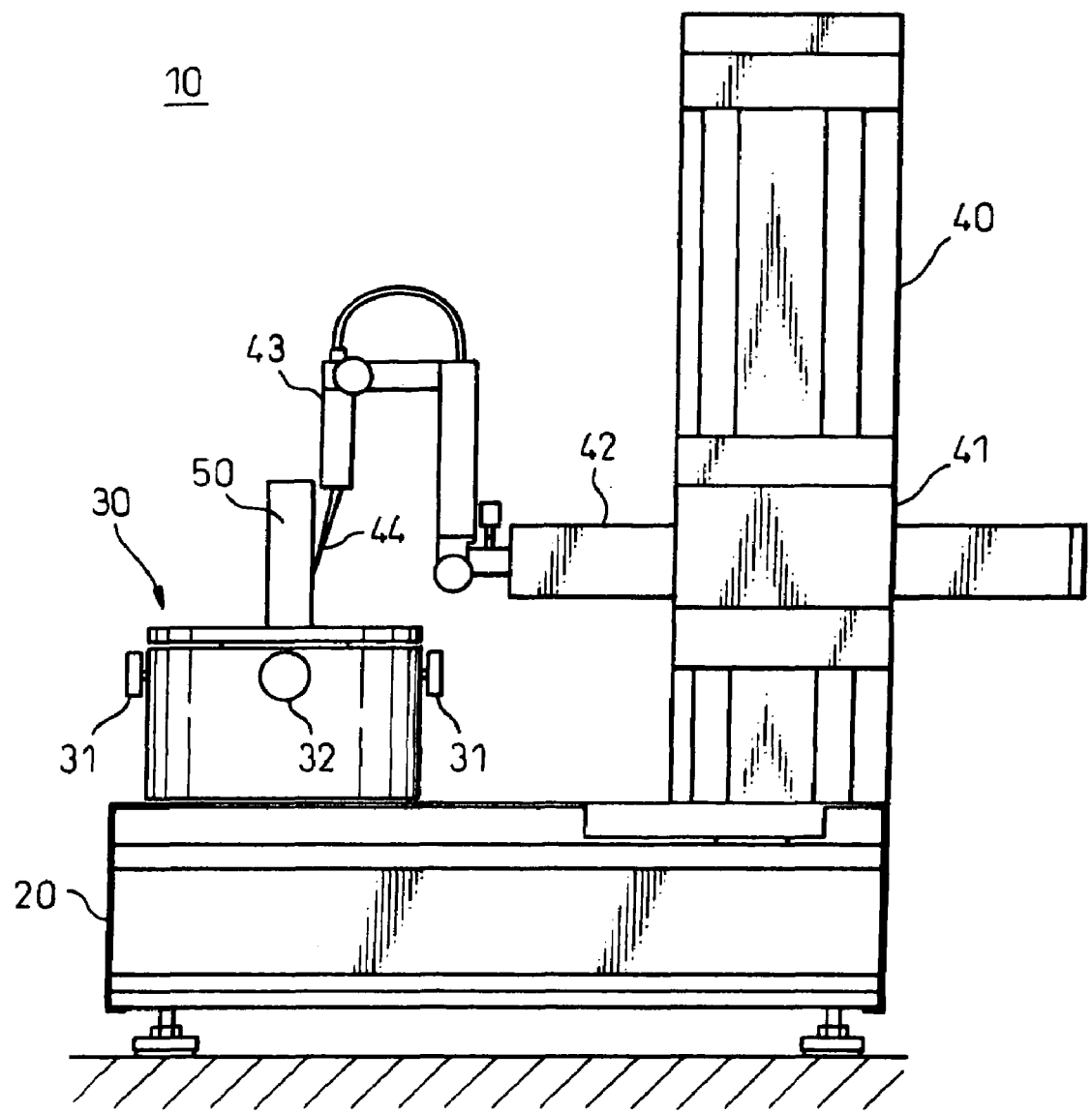
FIG. 1 is a front view showing a configuration of a conventional circularity and cylindrical shape measuring device.
Figure 2:
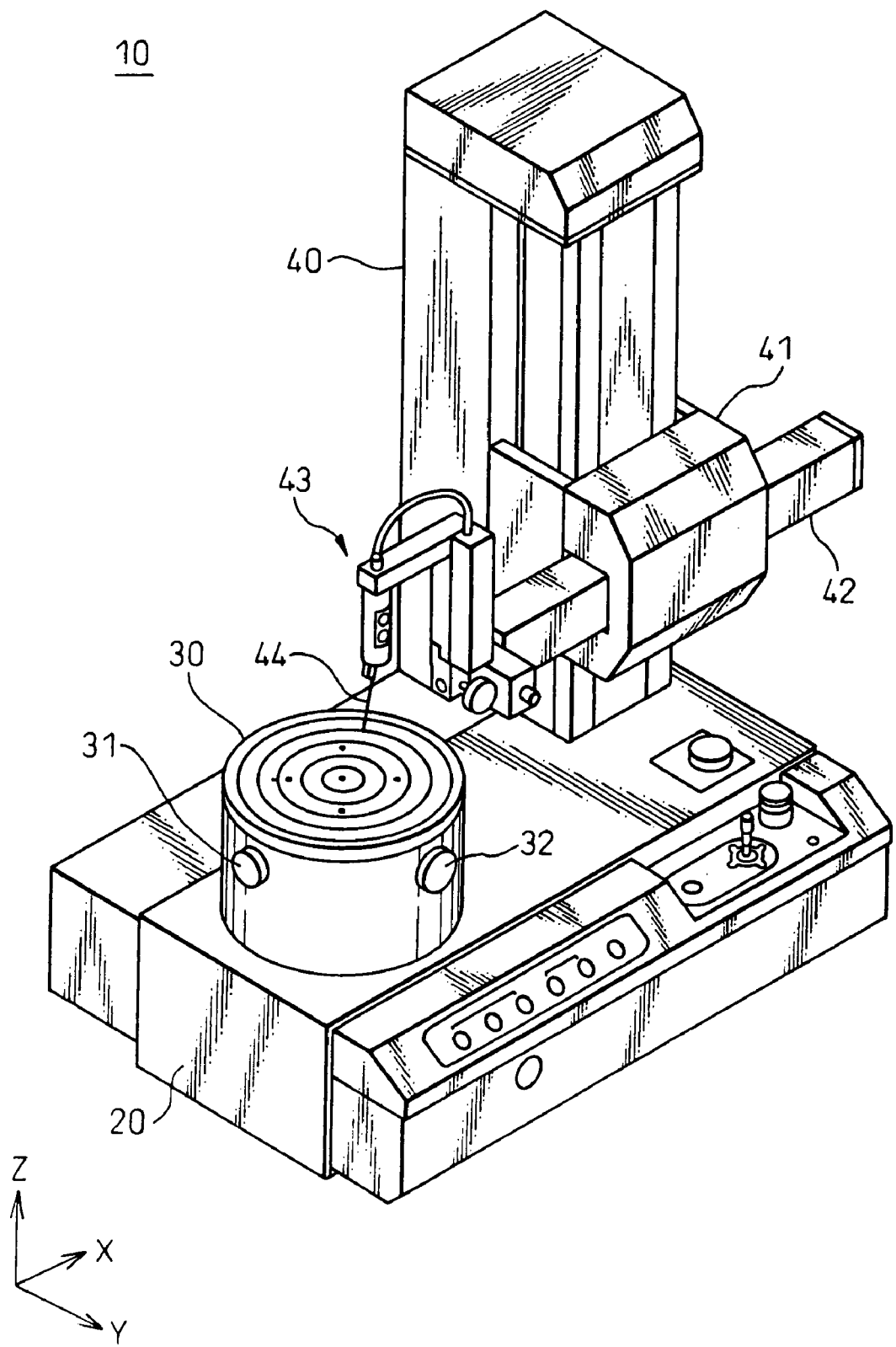
FIG. 2 is a perspective view showing a configuration of a circularity and cylindrical shape measuring device according to a first embodiment of the present invention.

Preferred embodiments of the present invention will be described in detail below while referring to the attached figures. FIG. 2 is a perspective view showing a configuration of a circularity and cylindrical shape measuring device according to a first embodiment of the present invention. The circularity and cylindrical shape measuring device 10 has a configuration similar to that of the device shown in FIG. 1. Functional parts of the device 10 shown in FIG. 2 identical with those shown in FIG. 1 are assigned with like reference numerals, and their explanation is omitted.

A direction of a driving axis of the column 40 is called a Z direction, and a plane perpendicular to the Z direction is called a XY plane. A direction of a straight line that connects between a rotation axis position of the rotary table 30 and a front end position of the probe 44 is called an X direction. A direction perpendicular to the X direction is called a Y direction.

FIGS. 3A and 3B are bottom plan views of the base table 20 of the circularity and cylindrical shape measuring device 10 shown in FIG. 2, to show a first example of a layout of legs that support the base table 20. In FIGS. 3A and 3B and FIG. 4 described later, only a lower surface of the base table 20 and the legs are expressed by solid lines. A lower surface of a top plate of the base table 20 viewed from below the base table 20, and the rotary table 30 and the column 40 are expressed by dotted lines.

In the layout example shown in FIG. 3A, the base table 20 is supported by three legs of 21A, 21B, and 22. In the layout example shown in FIG. 3B, the base table 20 is supported by four legs of 21A, 21B, 22A, and 22B. The legs 21A and 21B pass through the rotation axis (or the barycenter) of the rotation table 30, and are positioned on a straight line 62 parallel with the Y axis. In order to adjust evenness of the base table 20, the legs 21A and 21B can be level adjustors.

The rotary table 30 is provided so that the rotation axis of the rotary table 30 is positioned at the center of the base table 20 relative to the Y axis direction. The legs 21A and 21B are disposed symmetrically relative to a straight line 61 that passes through the rotation axis of the rotary table 30 and is parallel with the X axis. With this arrangement, preferably the influence of deflection generated in the base table 20 on the rotary axis of the rotary table 30 can be decreased in the Y axis direction. In the present layout example, the leg 22 is provided on the straight line 61.

The column 40 is provided on the base table 20 so that the barycenter of the moving mechanism which consists of the column 40, the up-and-down table 41, and arm 42 is positioned on the leg 22. With this arrangement, inclination of the moving axis of the moving mechanism due to the deflection of the base table 20 attributable to the weight of the moving mechanism can be prevented.

FIG. 4 is a bottom plan view of the base table 20 of the circularity and cylindrical shape measuring device 10 shown in FIG. 2, to show a second example of a layout of legs that support the base table 20. In the layout example shown in FIG. 4, the base table 20 is supported by three legs 21, 22A, and 22B. The leg 21 is disposed beneath the rotation axis (or the barycenter) of the rotary table 30. The leg 21 can be a level adjustor. Based on the provision of the leg 21 beneath the rotation axis (or the barycenter) of the rotary table 30, the influence of deflection generated in the base table 20 on the rotary axis of the rotary table 30 can be decreased in both the X axis direction and the Y axis direction.

The legs 22A and 22B are disposed on a straight line 63 that passes beneath the barycenter of the moving mechanism and is parallel with the Y axis. Based on the provision of the legs 22A and 22B in this manner, inclination of the moving axis of the moving mechanism due to the deflection of the base table 20 attributable to the weight of the moving mechanism can be prevented.

Preferably, the column 40 is provided so that the barycenter of the moving mechanism is positioned at the center of the base table 20 relative to the Y axis direction. Further, the legs 22A and 22B are disposed symmetrically with the straight line 61 that passes through the barycenter of the moving mechanism and is parallel with the X axis. Based on this arrangement, the influence of deflection generated in the base table 20 on the moving axis of the moving mechanism can be decreased in the Y direction.

When the leg 21 is to be provided beneath the rotation axis (or the barycenter) of the rotary table 30 as shown in FIG. 4, a leg fitting unit 23 that extends to a lower side of the rotation axis of the rotary table 30 needs to be provided on a casing of the base table 20.

When the leg fitting unit 23 is provided in the casing of the base table 20 to extend to a lower side of the rotation axis of the rotary table 30, it becomes difficult to build the rotary table 30, the driving mechanism, and auxiliary members into the casing from blow the base table 20, in the circularity and cylindrical shape measuring device 10. Preferably, maintenance work can be done from above the base table or on the side surface.

Figure 5:
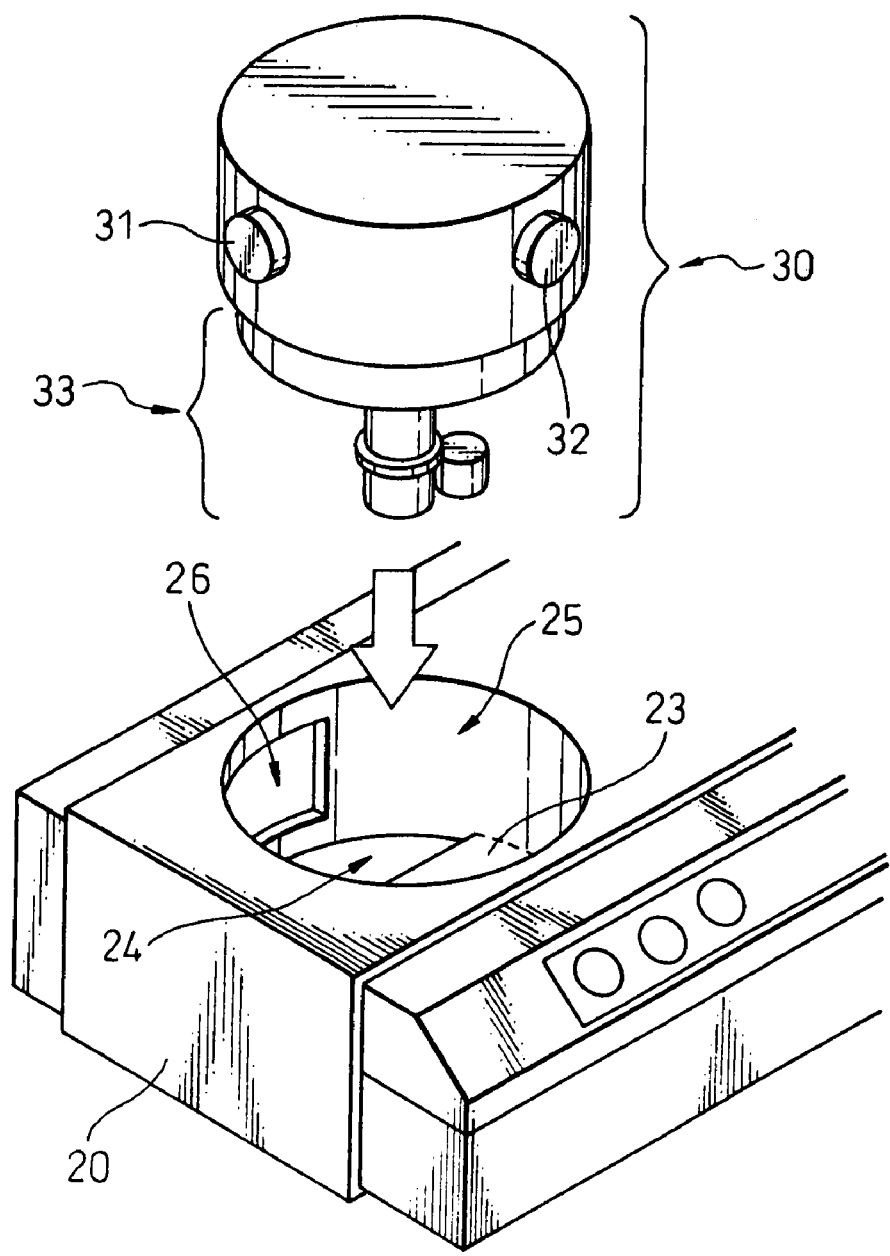
FIG. 5 is an explanatory diagram of a receiving part of a base table in which a lower mechanism of a rotary table is accepted.

Therefore, it is preferable to configure the circularity and cylindrical shape measuring device 10 such that the rotary table 30, the driving mechanism, and auxiliary members 33 are built into the base table 20 from above the base table 20, as shown in FIG. 5. Preferably, an opening for carrying out the work is provided on the side surface of the base table 20.

Preferably, an opening 26 is further provided on the casing of the base table 20. A driving belt, not shown, for transmitting driving force from an external motor not shown of the base table 20 that rotates the rotary table 30, and an output line of an encoder not shown of the rotary table 30, are put into the casing from the outside through this opening 26, or are taken out from the casing through this opening 26.

In order to facilitate the assembly work after building the rotary table 30 into the base table 20, preferably, the driving mechanism and the auxiliary members 33 of the rotary table 30 are configured to be able to be fixed to the rotary table 30 before building the rotary table 30 into the base table 20. Further, in order to facilitate the fitting of the driving belt to the rotary axis and each wiring work in the rotary table 30 after building the rotary table 30 into the base table 20, it is also preferable that an opening 24 is formed in the casing at the lower surface of the base table 20, as shown in FIG. 4 and FIG. 5.

Figure 6:
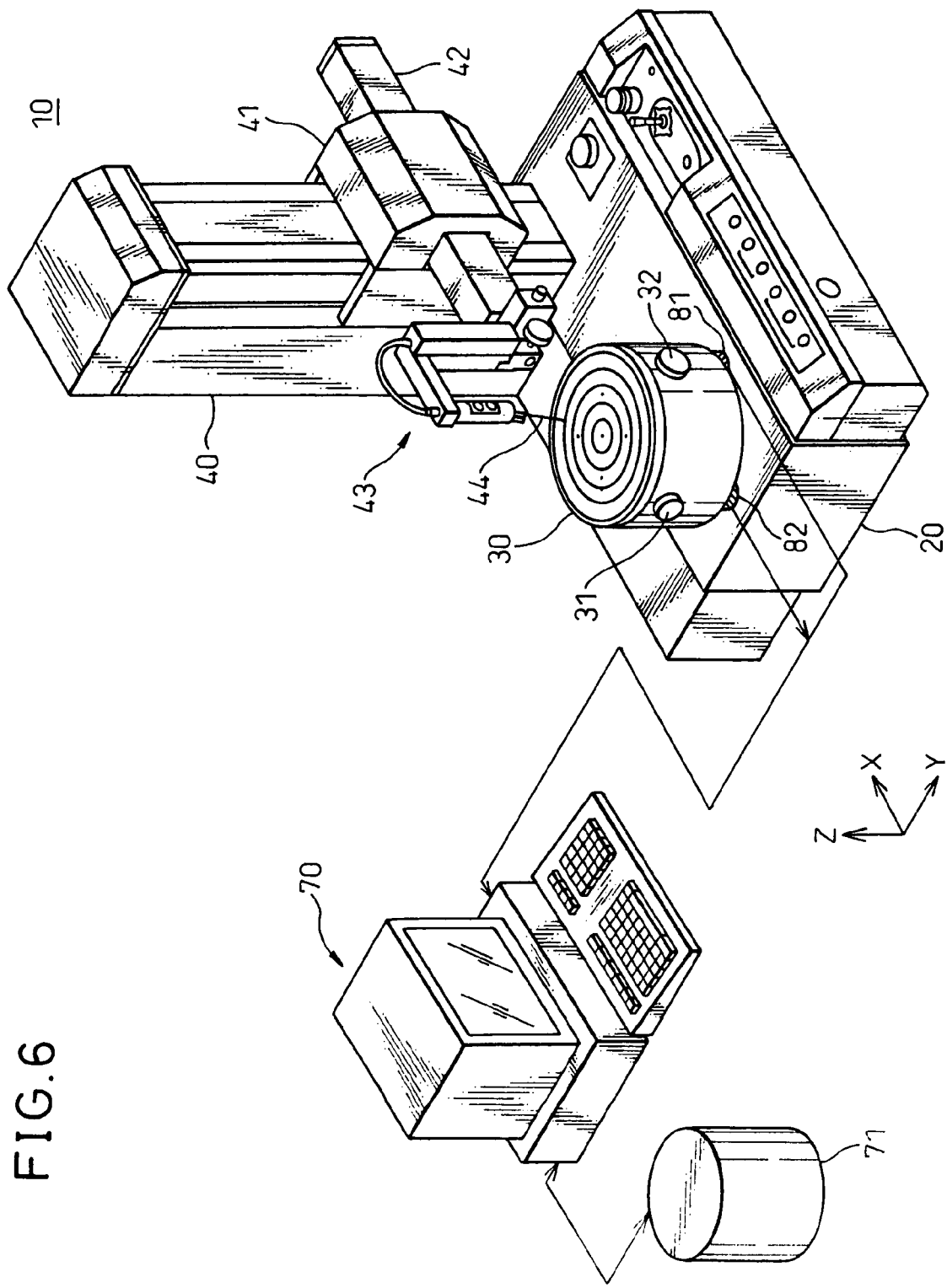
FIG. 6 is a perspective view showing a configuration of a circularity and cylindrical shape measuring device according to a second embodiment of the present invention.

FIG. 6 is a perspective view showing a configuration of a circularity and cylindrical shape measuring device according to a second embodiment of the present invention. The circularity and cylindrical shape measuring device 10 shown in FIG. 6 includes mass sensors 81 to 83 (the sensor 83 is not shown in FIG. 6) that detect the mass of the workpiece, and a measurement value correcting unit 70 such as a computer that corrects an error in a measurement result generated due to deflection of the base table 20 based on detection signals from the mass sensors 81 to 83. Functional parts of the circularity and cylindrical shape measuring device 10 shown in FIG. 6 identical with those of the device 10 shown in FIG. 1 are assigned the same reference numerals, and explanations are omitted, as with the device 10 explained with reference to FIG. 2.

The measurement value correcting unit 70 can be realized as software that operates on a controller such as a computer which controls the circularity and cylindrical shape measuring device 10 and takes a measurement value of the device 10, and as an input interface that inputs detection signals of the mass sensors 81 to 83 to the computer. Alternatively, the measurement value correcting unit 70 can be realized by hardware separate from the controller of the circularity and cylindrical shape measuring device 10.

When a workpiece, not shown, is mounted on the rotary table 30, the measurement value correcting unit 70 obtains mass of the workpiece based on detection signals from the mass sensors 81 to 83, and calculates a correction value for correcting the error of the measurement value due to deflection of the base table 20 generated when the workpiece has this mass.

The measurement value correcting unit 70 can calculate the correction value based on a predetermined calculation expression (i.e., an approximate expression) that relates the mass of the workpiece mounted on the rotary table 30 to a necessary correction value. Alternatively, the measurement value correcting unit 70 can obtain the correction value by using a table that stores a correction value determined in advance by obtaining a measurement value by mounting the workpiece on the rotary table 30, a correction value theoretically obtained in advance for each mass of the workpiece, and the mass of the workpiece, by relating these correction values to each other. The circularity and cylindrical shape measuring device 10 has a storage unit 71 that stores this table. The storage unit 71 can be provided integrally with the measurement value correcting unit 70 or the controller of the computer that controls the circularity and cylindrical shape measuring device 10.

The measurement value correcting unit 70 can also obtain the above correction value based on known mass of the workpiece that is input by the operator from an input unit of the computer, not only based on the mass of the workpiece detected by the mass sensors 81 to 83.

Figure 7A:
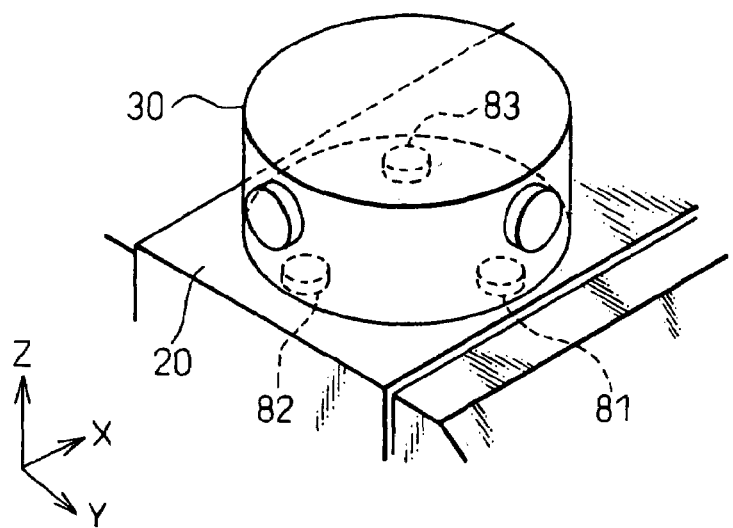
FIG. 7A to FIG. 7C are explanatory diagrams showing positions for installing mass sensors.

FIG. 7A is an explanatory diagram showing positions for installing mass sensors. As shown in FIG. 7A, it is preferable that at least three mass sensors are provided. When the three mass sensors 81 to 83 are provided, the mass of the workpiece can be detected, and a variation in the barycenter positions of the workpiece and the rotary table 30 following the rotation of the workpiece can be detected.

Therefore, preferably, the measurement value correcting unit 70 corrects measurement values corresponding to the variation in the barycenter positions of the workpiece and the rotary table 30, in addition to measurement values corresponding to the measured mass of the workpiece. In this case, it is preferable that the calculation expression or the table that the measurement value correcting unit 70 uses to carry out the correction is the calculation expression or the table that relates the mass of the workpiece, changes in the barycenter, and the necessary correction values to each other.

Due to a deviation of a generatrix of the workpiece that is mounted on the rotary table 30, the rotation axis of the rotary table 30 is also slightly inclined to the Y axis direction. Although this inclination is small, when it is necessary to prevent the influence on a measurement result in a high-precision measurement, it is preferable that the above calculation expression or the table used by the measurement value correcting unit 70 for the correction is prepared for both the X direction and the Y direction.

The installation positions of the mass sensors 81 to 83 are not limited to beneath the rotary table 30, but can be at the legs of the base table 20 when the mass of the workpiece and a variation in the barycenter can be detected at these positions.

The mass sensors and the measurement value correcting unit can be provided in the circularity and cylindrical shape measuring device according to the first embodiment of the present invention explained with reference to FIG. 2 to FIG. 5.

Figure 7B:
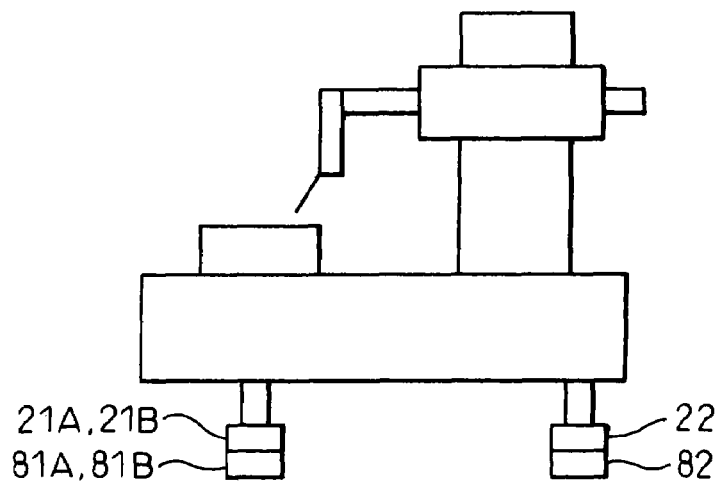
Figure 7C:
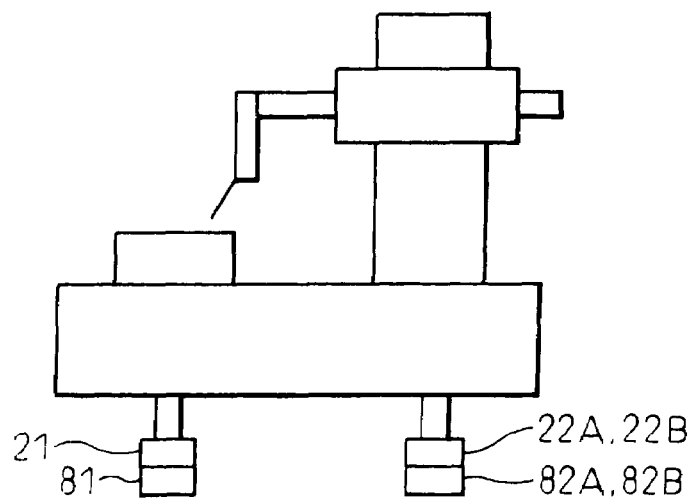

In this case, the mass sensors 81 to 83 can be provided beneath the rotary table 30 as shown in FIG. 7A. Alternatively, as shown in FIG. 7B, mass sensors 81A, 81B, and 82 can be provided on the legs 21A, 21B, and 22 respectively shown in FIG. 3. Alternatively, as shown in FIG. 7C, mass sensors 81, 82A, and 82B can be provided on the legs 21, 22A, and 22B respectively shown in FIG. 4.

When the rotation axis of the rotary table is provided on one of the legs that support the base table or on a straight line that connects between adjacent legs which support the base table, it is possible to prevent inclination of the rotation axis of the rotary table due to deflection of the base table attributable to the weight of the workpiece.

Further, when the moving mechanism is provided on one of legs that support the base table or on a straight line that connects between adjacent legs which support the base table, it is possible to prevent inclination of the moving mechanism due to deflection of the base table attributable to the weight of the moving mechanism.

Further, when an error in a measurement result generated due to deflection of the base table is corrected based on detection signals from the mass sensors that detect the mass of the workpiece, the influence of the deflection of the base table on the measurement result can be prevented.

While the present invention is suitable for application in the circularity and cylindrical shape measuring device, the application is not limited to this device. The invention can be also applied to general measuring devices that have a risk that the base table mounted with a workpiece is distorted due to the weight of the workpiece and this deflection causes a variation in a relative position between the workpiece and the probe, generating an error in the measurement result.

While the invention has been described with reference to specific embodiments chosen for purposes of illustration, it should be apparent that numerous modifications could be made thereto by those skilled in the art without departing from the basic concept and scope of the invention.

What is claimed is:

1. A circularity and cylindrical shape measuring device comprising:
   a rotating mechanism that rotates while having a workpiece to be measured mounted thereon;
   a moving mechanism that moves a probe which measures a surface position of the workpiece mounted on the rotating mechanism; and
   a base table that has at least three legs and supports the rotating mechanism and the moving mechanism, wherein a rotation axis of the rotating mechanism intersects an intermediate position of a straight line that connects two adjacent legs of the base table; wherein the moving mechanism is positioned on one of the legs of the base table.

2. A circularity and cylindrical shape measuring device according to claim 1, further comprising:
   a sensor for detecting mass of the workpiece, and a measurement value correcting unit for correcting an error in a measurement result generated due to deflection of the base table, based on detection signals from the sensor.

3. A circularity and cylindrical shape measuring device according to claim 1, further comprising:
   a measurement value correcting unit for inputting mass of the workpiece, and correcting an error in a measurement result generated due to deflection of the base table, based on the input mass.

4. A circularity and cylindrical shape measuring device according to claim 1, further comprising: a sensor for detecting mass of the workpiece, and a measurement value correcting unit for correcting an error in a measurement result generated due to deflection of the base table, based on detection signals from the sensor.

5. A circularity and cylindrical shape measuring device according to claim 1, further comprising: a measurement value correcting unit for inputting mass of the workpiece, and correcting an error in a measurement result generated due to deflection of the base table, based on the input mass.

6. A circularity and cylindrical shape measuring device comprising: a rotating mechanism that rotates while having a workpiece to be measured mounted thereon; a moving mechanism that moves a probe which measures a surface position of the workpiece mounted on the rotating mechanism; and a base table that has at least three legs and supports the rotating mechanism and the moving mechanism, wherein a rotation axis of the rotating mechanism intersects an intermediate position of a straight line that connects two adjacent legs of the base table, wherein the base table has three legs and a barycenter of the moving mechanism is positioned on a third leg of the base table different than the two adjacent legs.

7. A circularity and cylindrical shape measuring device according to claim 6, further comprising: a sensor for detecting mass of the workpiece, and a measurement value correcting unit for correcting an error in a measurement result generated due to deflection of the base table, based on detection signals from the sensor.

8. A circularity and cylindrical shape measuring device according to claim 6, further comprising: a measurement value correcting unit for inputting mass of the workpiece, and correcting an error in a measurement result generated due to deflection of the base table, based on the input mass.

* * * * *